United States Patent
Cheng

(10) Patent No.: US 9,123,125 B2
(45) Date of Patent: Sep. 1, 2015

(54) IMAGE PROCESSING METHOD AND ASSOCIATED APPARATUS

(71) Applicant: MEDIATEK INC., Hsin-Chu (TW)

(72) Inventor: Chia-Ming Cheng, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/300,243

(22) Filed: Jun. 10, 2014

(65) Prior Publication Data

US 2014/0286567 A1 Sep. 25, 2014

Related U.S. Application Data

(63) Continuation of application No. 13/335,952, filed on Dec. 23, 2011, now abandoned.

(51) Int. Cl.
| | |
|---|---|
| *G06T 3/00* | (2006.01) |
| *G06T 15/20* | (2011.01) |
| *H04N 13/02* | (2006.01) |
| *H04N 5/262* | (2006.01) |

(52) U.S. Cl.
CPC .............. *G06T 3/0093* (2013.01); *G06T 15/205* (2013.01); *H04N 13/026* (2013.01); *H04N 13/0221* (2013.01); *H04N 13/0296* (2013.01); *H04N 5/2627* (2013.01)

(58) Field of Classification Search
None
See application file for complete search history.

(56) References Cited

U.S. PATENT DOCUMENTS

| | | | | |
|---|---|---|---|---|
| 5,850,352 A | * | 12/1998 | Moezzi et al. | 345/419 |
| 6,674,892 B1 | * | 1/2004 | Melen | 382/154 |
| 2008/0310760 A1 | * | 12/2008 | Carlsen et al. | 382/294 |
| 2011/0141227 A1 | * | 6/2011 | Bigioi et al. | 348/36 |
| 2012/0140048 A1 | * | 6/2012 | Levine | 348/51 |
| 2012/0177284 A1 | * | 7/2012 | Wang | 382/154 |

OTHER PUBLICATIONS

Cheng et al, "A novel structure-from-motion strategy for refining depth map estimation and multi-view synthesis in 3DTV," 2010, In Multimedia and Expo (ICME), 2010 IEEE International Conference , pp. 944-949.*

Cheng et al., "A novel structure-from-motion strategy for refining depth map estimation and multi-view synthesis in 3DTV", Jul. 19-23, 2010, Multimedia and Expo(ICME), 2010 IEEE International Conference on, pp. 944-949.

(Continued)

*Primary Examiner* — Bhavesh Mehta
*Assistant Examiner* — David F Dunphy
(74) *Attorney, Agent, or Firm* — Winston Hsu; Scott Margo

(57) ABSTRACT

An image processing method includes: receiving a plurality of images, the images being captured under different view points; and performing image alignment for the plurality of images by warping the plurality of images, where the plurality of images are warped according to a set of parameters, and the set of parameters are obtained by finding a solution constrained to predetermined ranges of physical camera parameters. In particular, the step of performing the image alignment further includes: automatically performing the image alignment to reproduce a three-dimensional (3D) visual effect, where the plurality of images is captured by utilizing a camera module, and the camera module is not calibrated with regard to the view points. For example, the 3D visual effect can be a multi-angle view (MAV) visual effect. In another example, the 3D visual effect can be a 3D panorama visual effect. An associated apparatus is also provided.

18 Claims, 17 Drawing Sheets

(56) References Cited

OTHER PUBLICATIONS

Farre et al., "Automatic Content Creation for Multiview Autostereoscopic Displays Using Image Domain Warping", Jul. 11-15, 2011, Multimedia and Expo(ICME), 2011 IEEE International Conference on, pp. 1-6.
Lang et al., "Nonlinear Disparity Mapping for Stereoscopic 3D", Jul. 2010, ACM Transactions on Graphics, vol. 29, No. 4, Article 75, pp. 1-10(pages are labeled 75:1 to 75:10).
Wopking, "Viewing comfort with stereoscopic pictures: An experimental study on the subjective effects of disparity magnitude and depth of focus", 1995, Journal of the SID, 3/3, pp. 101-103.
Zhang et al., "Recovering consistent video depth maps via bundle optimization", 2008, Computer Vision and Pattern Recognition, IEEE Conference on, pp. 1-8.
Che-Han Chang, Chia-Kai Liang, and Yung-Yu Chuang, "Content-Aware Display Adaptation and Interactive Editing for Stereoscopic Images", IEEE Transactions on Multimedia, vol. 13, No. 4, Aug. 2011, pp. 589-601, 2011 IEEE.

* cited by examiner

IMAGE PROCESSING METHOD AND ASSOCIATED APPARATUS

CROSS REFERENCE TO RELATED APPLICATIONS

This application is a continuation application of U.S. patent application Ser. No. 13/335,952, which was filed on Dec. 23, 2011, and is included herein by reference.

BACKGROUND

The present invention relates to three-dimensional (3D) visual effect reproduction, and more particularly, to an image processing method, and to an associated apparatus.

According to the related art, 3D visual effect reproduction typically requires preparation of source images and complicated calculations. During a preparation stage, no matter whether the resolution of the source images is high or low, some problems may occur. For example, the source images should be captured from a plurality of pre-calibrated cameras, where the pre-calibrated cameras should have been calibrated with respect to predetermined view points or predetermined lines of views, which causes difficulty of the preparation of the source images. In another example, in order to perform the complicated calculations efficiently, it is required to prepare a high end computer having high calculation power, where the high end computer would never be replaced by a conventional multifunctional mobile phone since it seems unlikely that the conventional multifunctional mobile phone can work well under the heavy calculation load of the complicated calculations. That is, the conventional multifunctional mobile phone can never be a total solution to 3D production/reproduction. In conclusion, the related art does not serve the end user well. Thus, a novel method is required for performing image processing regarding 3D visual effect reproduction in a smart and robust manner, in order to implement the preparation of the source images mentioned above and associated calculations within a portable electronic device such as a multifunctional mobile phone.

SUMMARY

It is therefore an objective of the claimed invention to provide an image processing method, and to provide an associated apparatus, in order to solve the above-mentioned problems.

It is another objective of the claimed invention to provide an image processing method, and to provide an associated apparatus, in order to implement the preparation of the source images mentioned above and associated calculations within a portable electronic device such as a multifunctional mobile phone.

It is another objective of the claimed invention to provide an image processing method, and to provide an associated apparatus, in order to carry out a total solution to three-dimensional (3D) production/reproduction by utilizing a portable electronic device (e.g. a mobile phone, a laptop computer, or a tablet).

An exemplary embodiment of an image processing method comprises: receiving image data of a plurality of images, the images being captured under different view points (or along different lines of views); and performing image alignment for the plurality of images by warping the plurality of images according to the image data, wherein the plurality of images are warped according to a set of parameters, and the set of parameters are obtained by finding a solution constrained to predetermined ranges of physical camera parameters.

An exemplary embodiment of an apparatus for performing image processing is provided, where the apparatus comprises at least one portion of an electronic device. The apparatus comprises: a storage and a processing circuit. The storage is arranged to temporarily store information. In addition, the processing circuit is arranged to control operations of the electronic device, to receive image data of a plurality of images, the images being captured under different viewpoints (or along different lines of views), to temporarily store the image data into the storage, and to perform image alignment for the plurality of images by warping the plurality of images according to the image data, wherein the plurality of images are warped according to a set of parameters, and the set of parameters are obtained by finding a solution constrained to predetermined ranges of physical camera parameters.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
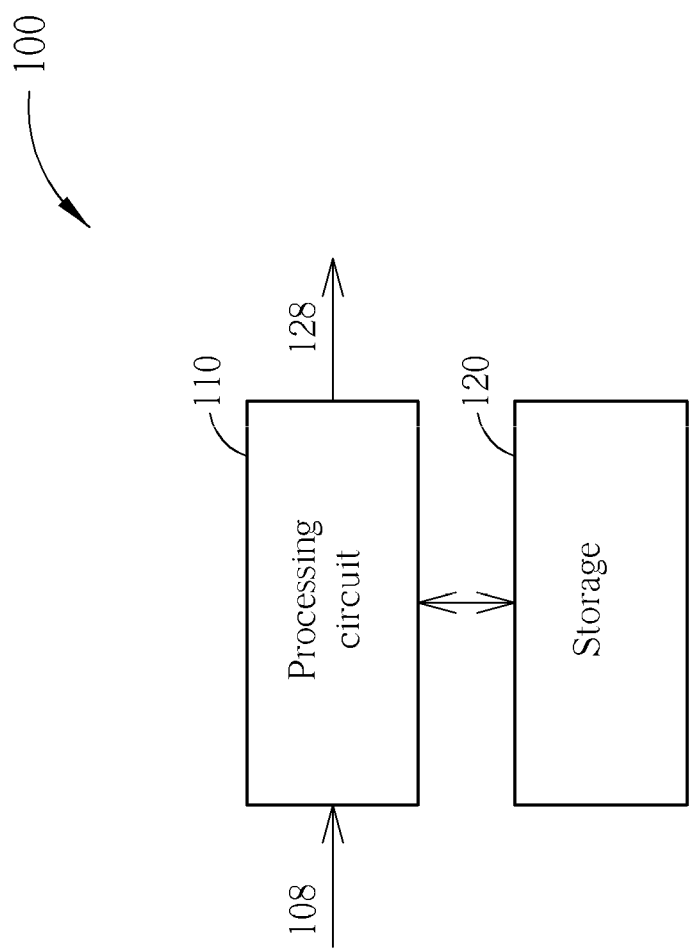
FIG. 1 is a diagram of an apparatus for performing image processing according to a first embodiment of the present invention.

Please refer to FIG. 1, which illustrates a diagram of an apparatus 100 for performing image processing according to a first embodiment of the present invention. According to different embodiments, such as the first embodiment and some variations thereof, the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a tablet personal computer (which can also be referred to as the tablet, for simplicity), a laptop computer, or desktop computer.

As shown in FIG. 1, the apparatus 100 comprises a processing circuit 110 and a storage 120. The storage 120 is arranged to temporarily store information, such as information carried by at least one input signal 108 that is inputted into the processing circuit 110. For example, the storage 120 can be a memory (e.g. a volatile memory such as a random access memory (RAM), or a non-volatile memory such as a Flash memory), or can be a hard disk drive (HDD). In addition, the processing circuit 110 is arranged to control operations of the electronic device, to receive image data of a plurality of images, the images being captured under different view points (or along different lines of views), to temporarily store the image data into the storage 120, and to perform image alignment for the plurality of images by warping the plurality of images according to the image data, where the plurality of images are warped according to a set of parameters, and the set of parameters are obtained by finding a solution constrained to predetermined ranges of physical camera parameters. For example, the images are captured, and more particularly, are arbitrarily captured under different view points by utilizing a camera module of the electronic device mentioned above, where the aforementioned image data can be received through the input signal 108 that is input into the processing circuit 110. This is for illustrative purposes only, and is not meant to be a limitation of the present invention. According to some variations of this embodiment, the images are captured, and more particularly, are arbitrarily captured under different view points by utilizing an external device such as a hand-held camera.

Please note that it is unnecessary for the camera module mentioned above to be calibrated. More particularly, the camera module of this embodiment is not calibrated with regard to the view points (or the lines of views) mentioned above. For example, in a situation where the electronic device is light enough for a user to hold it easily, the user may hold the electronic device to arbitrarily capture the images of some objects under these different view points. Then, the processing circuit 110 automatically performs the image alignment to reproduce a three-dimensional (3D) visual effect, and more particularly, generates 3D images to reproduce the 3D visual effect, where the 3D images may comprise emulated images that are not generated by utilizing any camera such as the camera module mentioned above. The processing circuit 110 may output information of the 3D images through at least one output signal 128 that carries the information of the 3D images. In practice, a screen of the electronic device can be utilized for displaying animation based upon the 3D images to reproduce the 3D visual effect. This is for illustrative purposes only, and is not meant to be a limitation of the present invention. According to some variations of this embodiment, the screen may provide the user with stereoscopic views based upon the 3D images to reproduce the 3D visual effect. No matter whether the screen is designed to provide stereoscopic views or not, examples of the 3D visual effect may comprise (but not limited to) a multi-angle view (MAV) visual effect and a 3D panorama visual effect. According to some variations of this embodiment, the apparatus 100 can output the information of the 3D images, in order to reproduce the 3D visual effect by utilizing an external display device.

Figure 2:
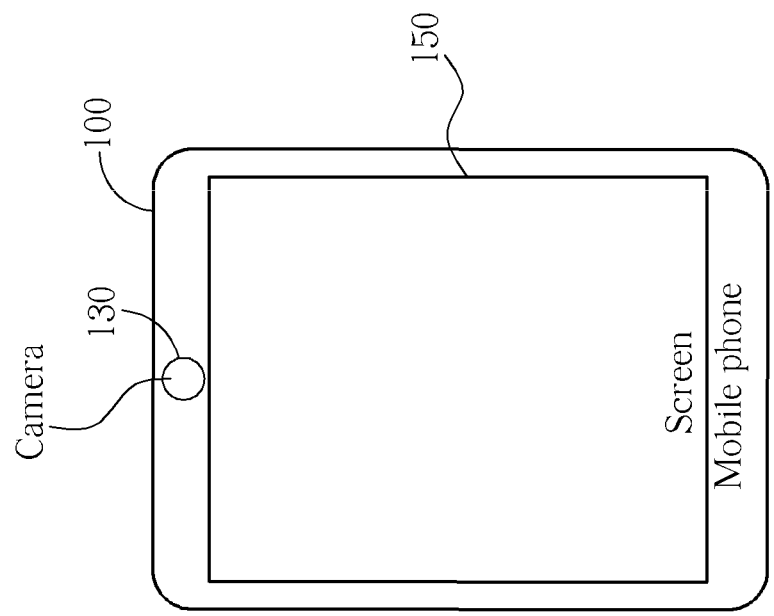
FIG. 2 illustrates the apparatus shown in FIG. 1 according to an embodiment of the present invention, where the apparatus of this embodiment is a mobile phone.

FIG. 2 illustrates the apparatus 100 shown in FIG. 1 according to an embodiment of the present invention, where the apparatus 100 of this embodiment is a mobile phone, and therefore, is labeled "Mobile phone" in FIG. 2. A camera module 130 (labeled "Camera" in FIG. 2, for brevity) is taken as an example of the camera module mentioned in the first embodiment, and is installed within the apparatus 100 mentioned above (i.e. the mobile phone in this embodiment), which means the apparatus 100 comprises the camera module 130. According to this embodiment, the camera module 130 is positioned around an upper side of the apparatus 100. This is for illustrative purposes only, and is not meant to be a limitation of the present invention. According to some variations of this embodiment, the camera module 130 can be positioned around another side of the apparatus 100. In addition, a touch screen 150 (labeled "Screen" in FIG. 2, for brevity) is taken as an example of the screen mentioned in the first embodiment, and is installed within the apparatus 100 mentioned above, which means the apparatus 100 comprises the touch screen 150. As shown in FIG. 2, the camera module 130 can be utilized for capturing the plurality of images mentioned above. For example, by analyzing the image data of the images, the processing circuit 110 can perform feature extraction and feature matching to determine/find out the aforementioned solution constrained to the predetermined ranges of physical camera parameters, such as some predetermined ranges of physical parameters of the camera module 130 (e.g. directions/angles of the lines of views of the camera module 130). As a result, the processing circuit 110 can generate the 3D images bounded to the aforementioned solution, in order to reproduce the 3D visual effect without introducing visible artifacts.

Figure 3:
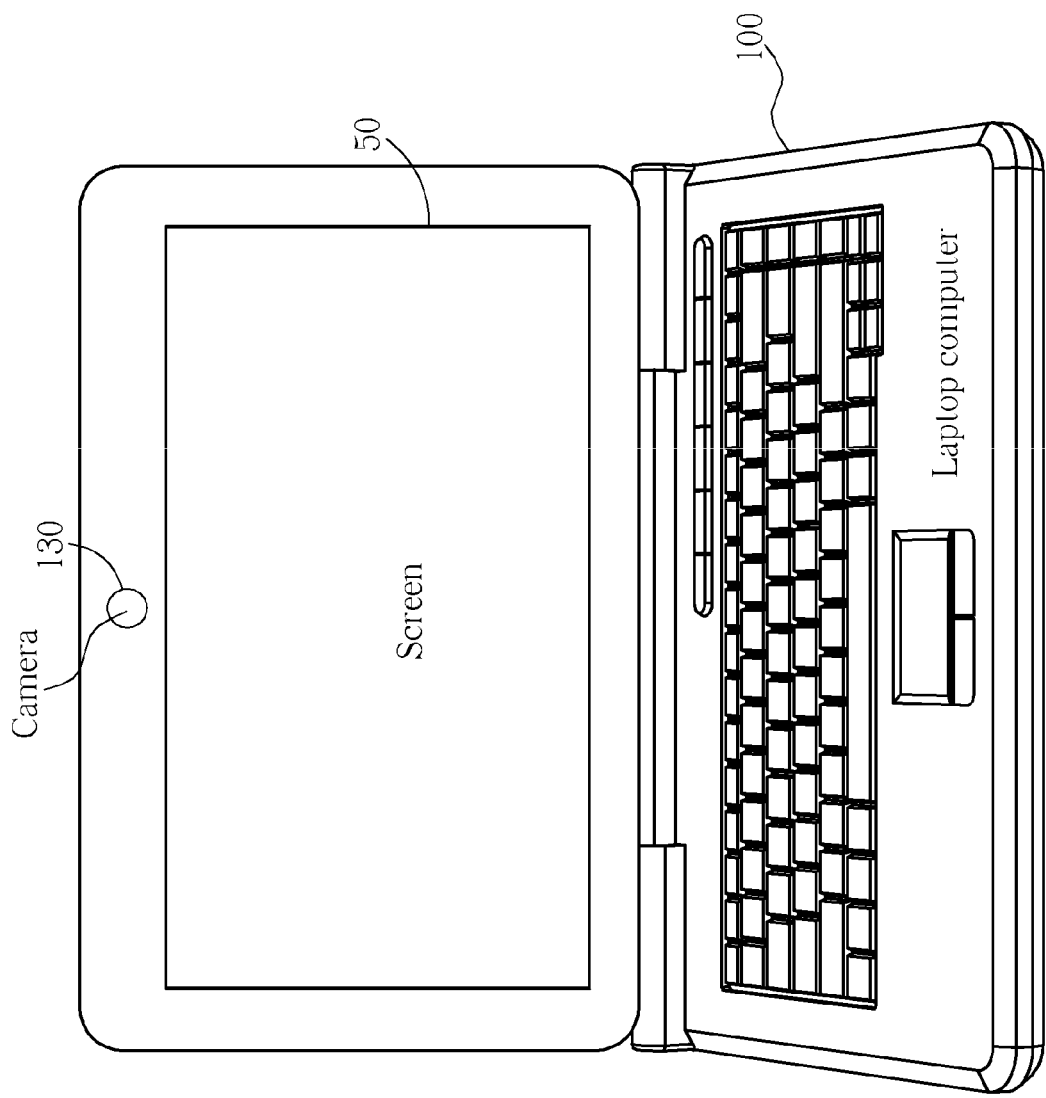
FIG. 3 illustrates the apparatus shown in FIG. 1 according to another embodiment of the present invention, where the apparatus of this embodiment is a personal computer such as a laptop computer.

FIG. 3 illustrates the apparatus 100 shown in FIG. 1 according to another embodiment of the present invention, where the apparatus 100 of this embodiment is a personal computer such as a laptop computer, and therefore, is labeled "Laptop computer" in FIG. 3. The camera module 130 (labeled "Camera" in FIG. 3, for brevity) is taken as an example of the camera module mentioned in the first embodiment, and is installed within the apparatus 100 mentioned above (i.e. laptop computer in this embodiment), which means the apparatus 100 comprises the camera module 130. According to this embodiment, the camera module 130 is positioned around an upper side of the apparatus 100. This is for illustrative purposes only, and is not meant to be a limitation of the present invention. According to some variations of this embodiment, the camera module 130 can be positioned around another side of the apparatus 100. In addition, a screen 50 (e.g. a liquid crystal display (LCD) panel) is taken as an example of the screen mentioned in the first embodiment, and is installed within the apparatus 100 mentioned above, which means the apparatus 100 comprises the screen 50. Similar descriptions are not repeated in detail for this embodiment.

Figure 4:
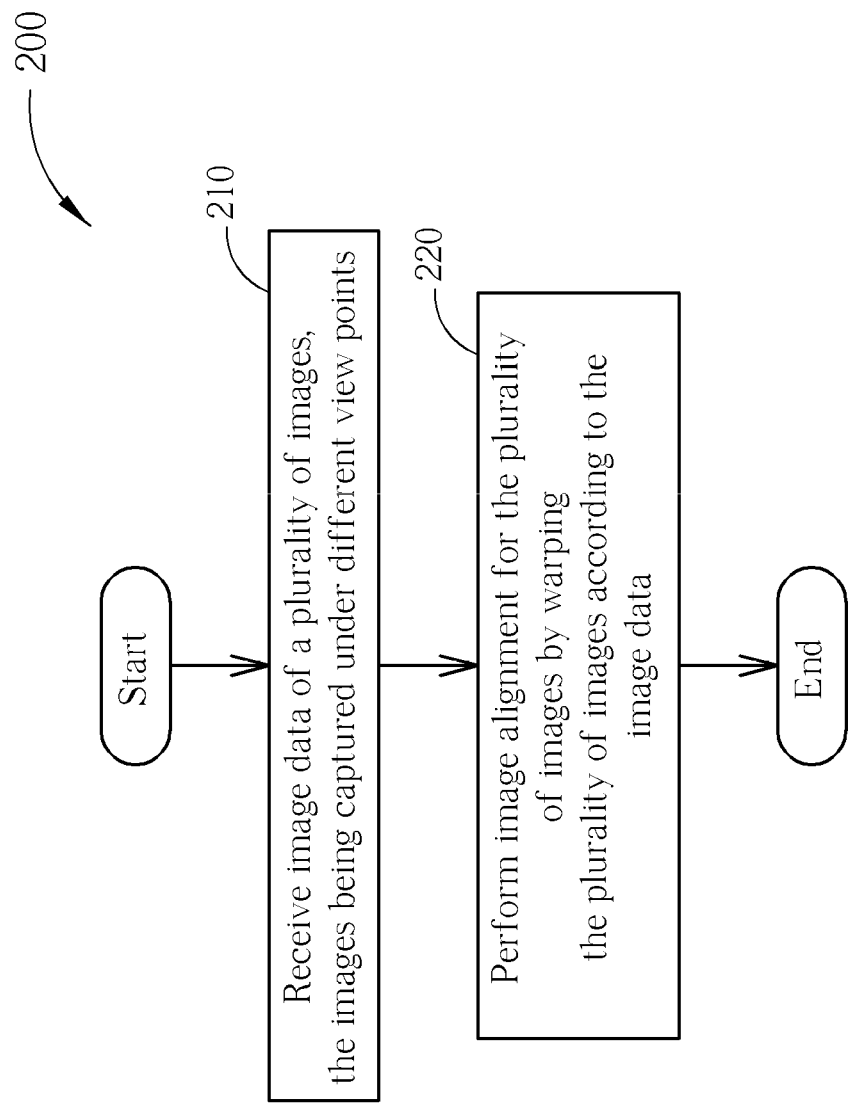
FIG. 4 illustrates a flowchart of an image processing method according to an embodiment of the present invention.

FIG. 4 illustrates a flowchart of an image processing method 200 according to an embodiment of the present invention. The image processing method 200 shown in FIG. 4 can be applied to the apparatus 100 shown in FIG. 1, and more particualrly, the apparatus 100 of any of the embodiments respectively shown in FIG. 3 and FIG. 4. The image processing method 200 is described as follows.

In Step 210, the processing circuit 110 receives image data of a plurality of images, the images being captured under different view points (e.g., the plurality of images disclosed in the first embodiment). In this embodiment, the aforementioned image data can be received through the input signal 108 that is input into the processing circuit 110. For example, the images are captured under these different view points (or along different lines of views), and more particularly, are arbitrarily captured by utilizing a camera module such as the camera module 130 disclosed above. Please note that it is unnecessary for the camera module mentioned above to be calibrated. More particularly, the camera module of this embodiment is not calibrated with regard to the view points.

In Step 220, the processing circuit 110 performs image alignment for the plurality of images by warping the plurality of images according to the image data, where the plurality of images are warped according to a set of parameters, and the set of parameters are obtained by finding a solution constrained to predetermined ranges of physical camera parameters. More particularly, the image alignment may include vertical alignment and horizontal alignment, where the horizontal alignment is typically performed after the vertical alignment is performed. For example, the horizontal alignment can be performed under disparity analysis, where the disparity analysis is utilized for analyzing warped images of the vertical alignment. This is for illustrative purposes only, and is not meant to be a limitation of the present invention. According to some variations of this embodiment, the preparation/beginning of the horizontal alignment can be performed after the preparation/beginning of the vertical alignment is performed, and the horizontal alignment and the vertical alignment can be completed at the same time when some warping operations are completed.

According to this embodiment, in order to achieve better performance during the operations disclosed above, the processing circuit 110 is preferably arranged to determine the aforementioned predetermined ranges of physical camera parameters in advance by performing operations of sub-steps (1), (2), (3), (4), and (5) as follows:

(1) the processing circuit 110 controls the camera module 130 to capture a base image, such as one of the plurality of images mentioned in Step 210;

(2) the processing circuit 110 controls the camera module 130 to capture multiple reference images, such as others within the plurality of images mentioned in Step 210;

(3) the processing circuit 110 records one set of physical camera parameters corresponding to each reference image, where the aforementioned one set of physical camera parameters can be some location/coordinate-related physical parameters of the camera module 130 disclosed above (e.g. directions/angles of the lines of views of the camera module 130), and may comprise some physical parameters that are not location/coordinate-related (e.g. focal lengths and some other lens parameters of the camera module 130);

(4) the processing circuit 110 records warps the base image to match each reference image according to the recorded set of physical camera parameters, and therefore, generates a series of warped base images corresponding to each reference image; and (5) the processing circuit 110 determines the aforementioned predetermined ranges of physical camera parameters by finding whether difference (s) between warped base images and the reference images is distinguishable under human vision, where the criterion (or criteria) for determining whether the difference(s) is distinguishable under human vision or not can be predefined based upon some predefined rules.

Thus, the processing circuit 110 eventually determines the aforementioned predetermined ranges of physical camera parameters, in order to achieve better performance during the operations disclosed in FIG. 4. As a result, for an arbitrary set of physical camera parameters that respectively fall within the aforementioned predetermined ranges of physical camera parameters (e.g. a set of physical camera parameters, each of which falls within the corresponding predetermined ranges of the aforementioned predetermined ranges), no difference between any warped base image corresponding to this set of physical camera parameters and the reference images is distinguishable under human vision.

Please not that, by performing the operations of sub-steps (1), (2), (3), (4), and (5) disclosed above, the solution constrained to the aforementioned predetermined ranges of physical camera parameters (i.e. the solution mentioned in the descriptions for Step 220) can be found, where the solution allows the base image to be arbitrarily warped while the associated physical camera parameters of this arbitrarily warping operation keep falling within the aforementioned predetermined ranges of physical camera parameters. As the aforementioned predetermined ranges of physical camera parameters is preferably determined by finding whether any difference between warped base images and the reference images is distinguishable under human vision, the solution guarantees that this arbitrarily warping operation will not cause any artifact that is distinguishable under human vision. Therefore, no artifact will be found.

In this embodiment, the sub-steps (1), (2), (3), (4), and (5) are taken as examples of the operations of determining the aforementioned predetermined ranges of physical camera parameters. This is for illustrative purposes only, and is not meant to be a limitation of the present invention. According to some variations of this embodiment, it is unnecessary to perform all of the sub-steps (1), (2), (3), (4), and (5). According to some variations of this embodiment, other sub-step(s) may be included.

Figure 5:
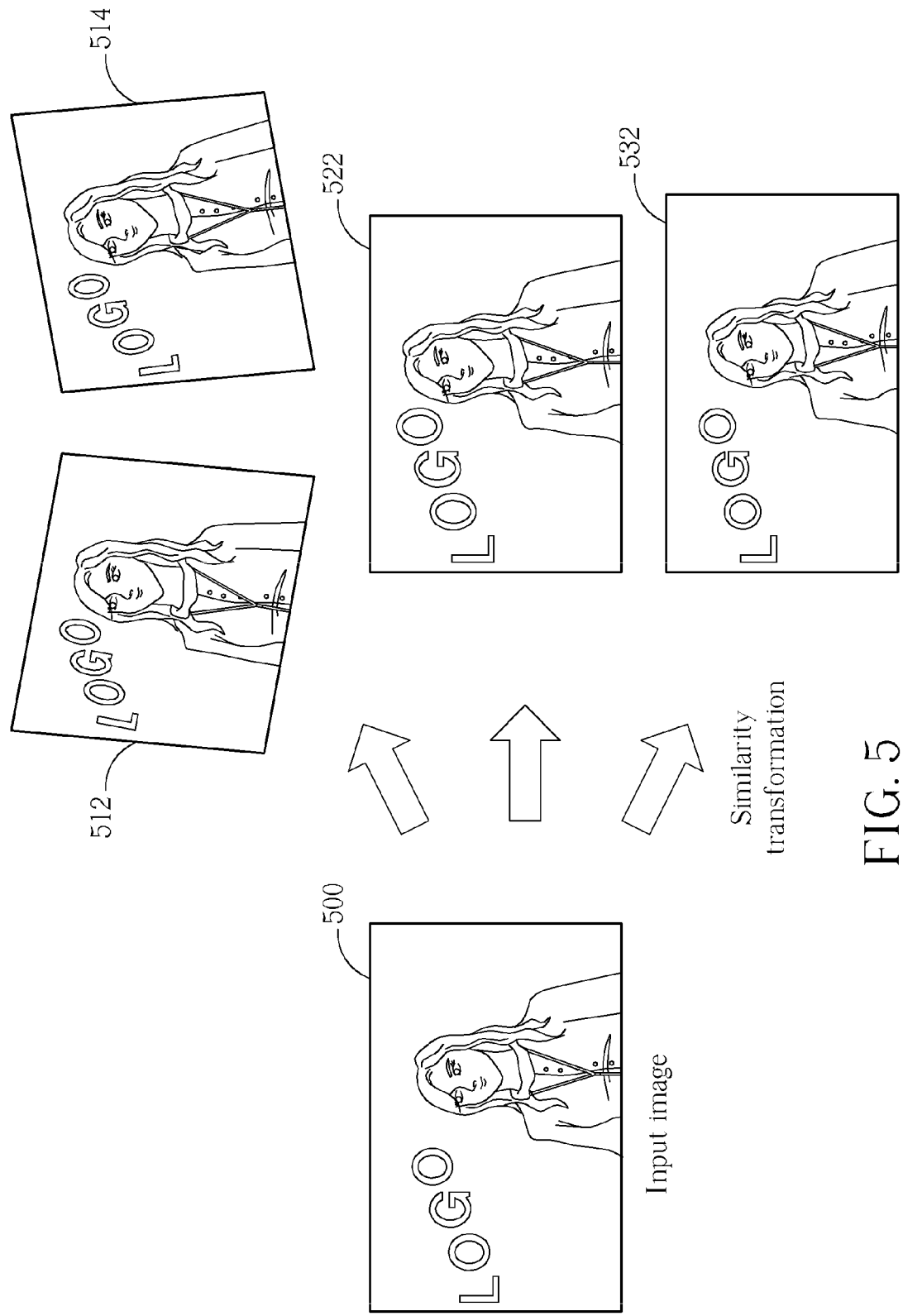
FIG. 5 illustrates an input image and some transformation images generated during a learning/training procedure involved with the image processing method shown in FIG. 4 according to an embodiment of the present invention, where the learning/training procedure is utilized for determining a predefined solution space.

FIG. 5 illustrates an input image 500 and some transformation images 512, 514, 522, and 532 generated during a learning/training procedure involved with the image processing method 200 shown in FIG. 4 according to an embodiment of the present invention, where the learning/training procedure is utilized for determining a predefined solution space (e.g. a pre-trained solution space).

As shown in FIG. 5, the processing circuit 110 performs similarity transformation on the input image 500 by performing a plurality of warping operations to generate the transformation images 512, 514, 522, and 532, in order to find out the solution mentioned in the descriptions for Step 220. Please note that some of these warping operations performed during the learning/training procedure may cause visible artifacts, which are allowed during the learning/training procedure. In this embodiment, the criterion (or criteria) for determining whether the difference mentioned in the sub-step (5) of the embodiment shown in FIG. 4 is distinguishable under human vision or not is predefined based upon some predefined rules, and therefore, the solution mentioned in the descriptions for Step 220 can be referred to as the predefined solution space. For example, the processing circuit 110 provides the user with an interface, allowing the user to determine whether a transformation image under consideration (e.g. one of the transformation images 512, 514, 522, and 532) has any artifact that is distinguishable under human vision. When the user determines that the transformation image under consideration does not have any artifact, the processing circuit 110 expands the predefined solution space (e.g., the predefined solution space is expanded to include the ranges of physical camera parameters corresponding to the transformation image under consideration); otherwise, the processing circuit 110 shrinks the predefined solution space (e.g., the predefined solution space is shrunk to exclude the ranges of physical camera parameters corresponding to the transformation image under consideration). Please note that the input image 500 can be the base image mentioned in the sub-step (1) of the embodiment shown in FIG. 4. This is for illustrative purposes only, and is not meant to be a limitation of the present invention. According to some variations of this embodiment, the input image 500 can be one of the reference images mentioned in the sub-step (2) of the embodiment shown in FIG. 4.

As a result of performing the similarity transformation, the processing circuit 110 eventually determines the aforementioned predetermined ranges of physical camera parameters, where any warped image that is bounded within the predefined solution space will not have any artifact that is distinguishable under human vision. For example, in a situation where the transformation image 522 is a warped image that is bounded within the predefined solution space, the similarity transformation corresponding to the transformation image 522 can be considered to be visually insensible 3D similarity transformation with regard to physical camera parameters, where "visually insensible" typically represents "deformation of warped image is hard to be distinguished by human vision". Similar descriptions are not repeated in detail for this embodiment.

In the following embodiments such as those shown in FIGS. 6-10, with the aid of the learning/training results regarding the aforementioned solution such as the predefined solution space (e.g. the pre-trained solution space), the processing circuit 110 is capable of performing visually insensible image warping. As a result, the image alignment mentioned in the descriptions for Step 220 (e.g. the vertical alignment and the horizontal alignment) and the associated image warping (if any, for reproducing the 3D visual effect mentioned above) will not cause any artifact that is distinguishable under human vision.

Figure 6:
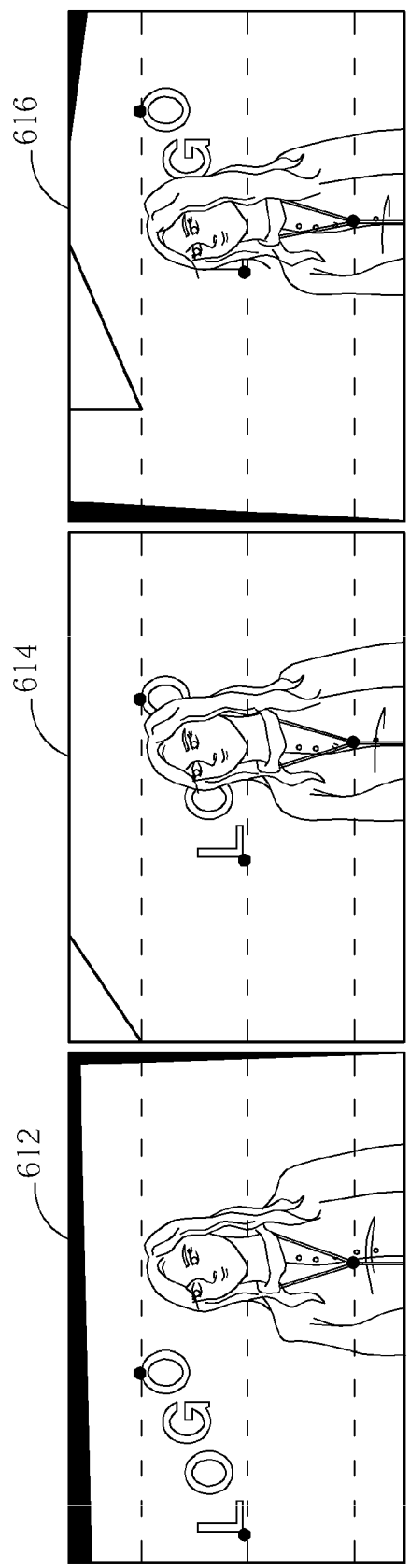
FIG. 6 illustrates some images obtained from multi-view vertical alignment involved with the image processing method shown in FIG. 4 according to an embodiment of the present invention.

FIG. 6 illustrates some images 612, 614, and 616 obtained from multi-view vertical alignment involved with the image processing method 200 shown in FIG. 4 according to an embodiment of the present invention. In this embodiment, the multi-view vertical alignment disclosed in FIG. 6 is taken as an example of the vertical alignment mentioned in the descriptions for Step 220.

As shown in FIG. 6, some video objects respectively shown in the images 612, 614, and 616 are the same object in the real world. For example, each of the images 612, 614, and 616 comprises a partial image of the same person and further comprises a partial image of the same logo (which is illustrated with a warped shape of "LOGO"). The processing circuit 110 performs feature extraction on each of the images 612, 614, and 616 and performs feature matching for the images 612, 614, and 616 to find out some common feature points in each of the images 612, 614, and 616, such as the feature points illustrated with small circles on the three dashed lines crossing the images 612, 614, and 616 within FIG. 6. For example, in each of the images 612, 614, and 616, one of the common feature points can be located at the upper right corner of the logo, another of the common feature points can be located at the lower left corner of the logo, and another of the common feature points can be located at a junction of something worn by the person.

During the multi-view vertical alignment, the processing circuit 110 aligns the images 612, 614, and 616 by performing rotating and/or shifting operations of their original images, which are multi-view images respectively corresponding to three view points (or three lines of views) and are a portion of the plurality of images mentioned in Step 210 in this embodiment. As a result of performing the multi-view vertical alignment, the common feature points in the images 612, 614, and 616 are aligned to the same vertical locations (or the same horizontal lines such as the three dashed lines shown in FIG. 6), respectively, where the dashed lines crossing the three images 612, 614, and 616 within FIG. 6 indicates the alignment results of the multi-view vertical alignment. Thus, the processing circuit 110 performs optimization over geometry constraint to solve the optimal camera parameters within a predefined solution space such as that mentioned above, and more particularly, a predefined visually insensible solution space. Similar descriptions are not repeated in detail for this embodiment.

Figure 7:
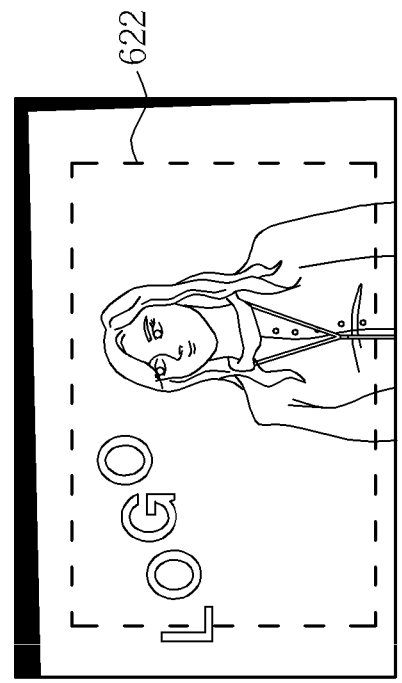
FIG. 7 illustrates one of the images obtained from the multi-view vertical alignment and an associated image obtained from horizontal alignment involved with the image processing method shown in FIG. 4 according to an embodiment of the present invention.
Figure 7:
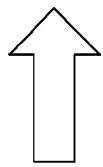
Figure 7:
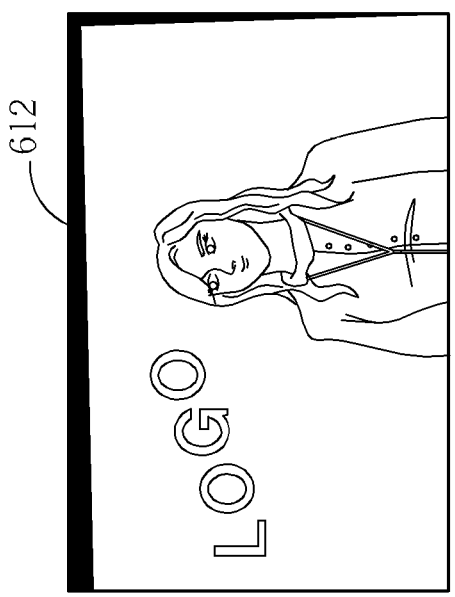
Figure 8:
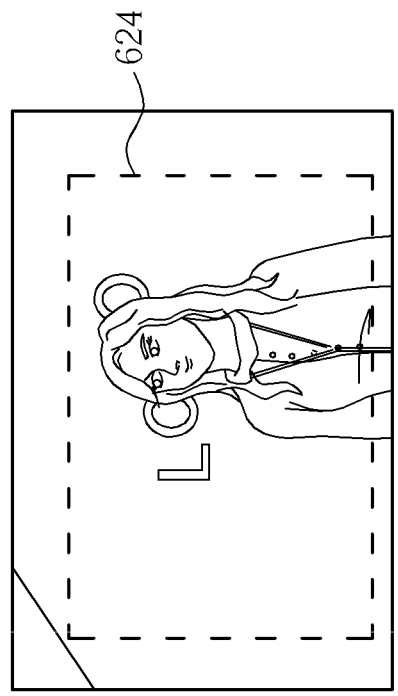
FIG. 8 illustrates another of the images obtained from the multi-view vertical alignment and an associated image obtained from the horizontal alignment according to the embodiment shown in FIG. 7.
Figure 8:
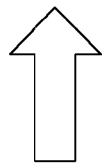
Figure 8:

FIG. 7 illustrates one of the images 612, 614, and 616 obtained from the multi-view vertical alignment, such as the image 612, and an associated image 622 obtained from horizontal alignment involved with the image processing method 200 shown in FIG. 4 according to an embodiment of the present invention. In addition, FIG. 8 illustrates another of the images 612, 614, and 616 obtained from the multi-view vertical alignment, such as the image 614, and an associated image 624 obtained from the horizontal alignment according to this embodiment. Additionally, FIG. 9 illustrates another of the images 612, 614, and 616 obtained from the multi-view vertical alignment, such as the image 616, and an associated image 626 obtained from the horizontal alignment according to this embodiment.

Figure 9:
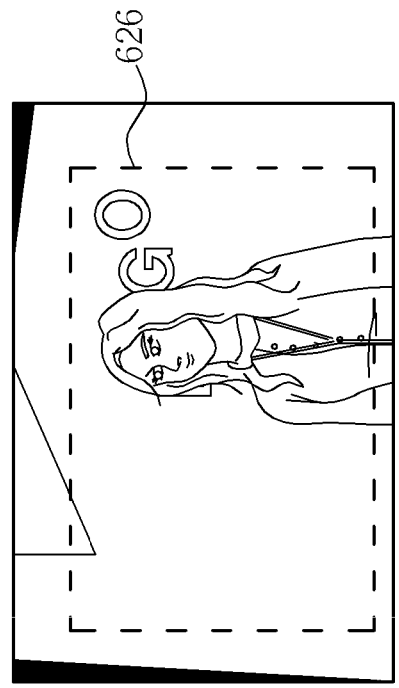
FIG. 9 illustrates another of the images obtained from the multi-view vertical alignment and an associated image obtained from the horizontal alignment according to the embodiment shown in FIG. 7.
Figure 9:
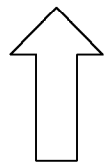
Figure 9:
Figure 10:
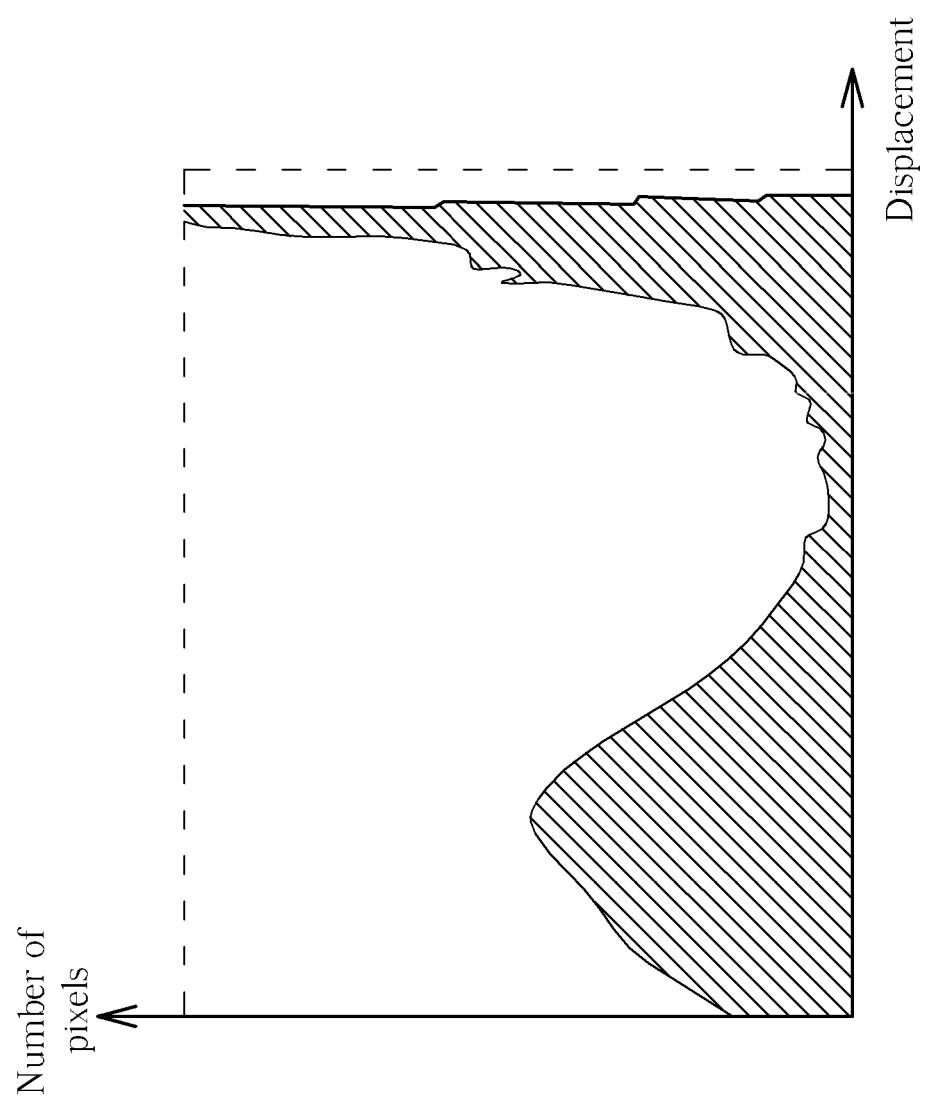
FIG. 10 illustrates a disparity histogram involved with the image processing method shown in FIG. 4 according to an embodiment of the present invention.

The horizontal alignment disclosed in FIG. 7, FIG. 8, and FIG. 9 is taken as an example of the horizontal alignment mentioned in the descriptions for Step 220. In practice, the processing circuit 110 can perform disparity histogram analysis for two-dimensional (2D) translation of warped images. For example, the processing circuit 110 calculates the number of pixels with regard to displacement (more particularly, horizontal displacement) for each of the images 612, 614, and 616, in order to generate a disparity histogram for each of the images 612, 614, and 616, such as that shown in FIG. 10. As shown in FIG. 10, the horizontal axis represents the displacement (more particularly, the horizontal displacement) of at least one pixel (e.g., a single pixel or a group of pixels) within the image under consideration in comparison with a certain image, and the vertical axis represents the number of pixels, where the image under consideration can be any of the images 612, 614, and 616, and the aforementioned certain image can be the base image or a specific image selected from the images 612, 614, and 616. By performing the disparity histogram analysis, the processing circuit 110 can determine whether to or how to crop the image under consideration, in order to perform the horizontal alignment. For example, the processing circuit 110 performs the horizontal alignment on the image 612 by cropping a portion of the image 612 to obtain the image 622. In another example, the processing circuit 110 performs the horizontal alignment on the image 614 by cropping a portion of the image 614 to obtain the image 624. In another example, the processing circuit 110 performs the horizontal alignment on the image 616 by cropping a portion of the image 616 to obtain the image 626. Similar descriptions are not repeated in detail for this embodiment.

According to an embodiment of the present invention, such as a combination of the embodiments respectively shown in FIGS. 5-10, the processing circuit 110 performs the learning/training procedure, the multi-view vertical alignment, and the horizontal alignment as disclosed above, and further performs sequence reproduction, for reproducing the 3D visual effect mentioned above. For example, the processing circuit 110 performs the sequence reproduction by generating a series of warped images {613-1, 613-2, ... } that vary from the image 612 to the image 614 and by generating a series of warped images {615-1, 615-2, ... } that vary from the image 614 to the image 616 to output an image sequence {612, {613-1, 613-2, ... }, 614, {615-1, 615-2, ... }, 616}, in order to display animation based upon the images of the image sequence {612, {613-1, 613-2, ... }, 614, {615-1, 615-2, ... }, 616}, for reproducing the 3D visual effect. Similar descriptions are not repeated in detail for this embodiment.

Figure 11:
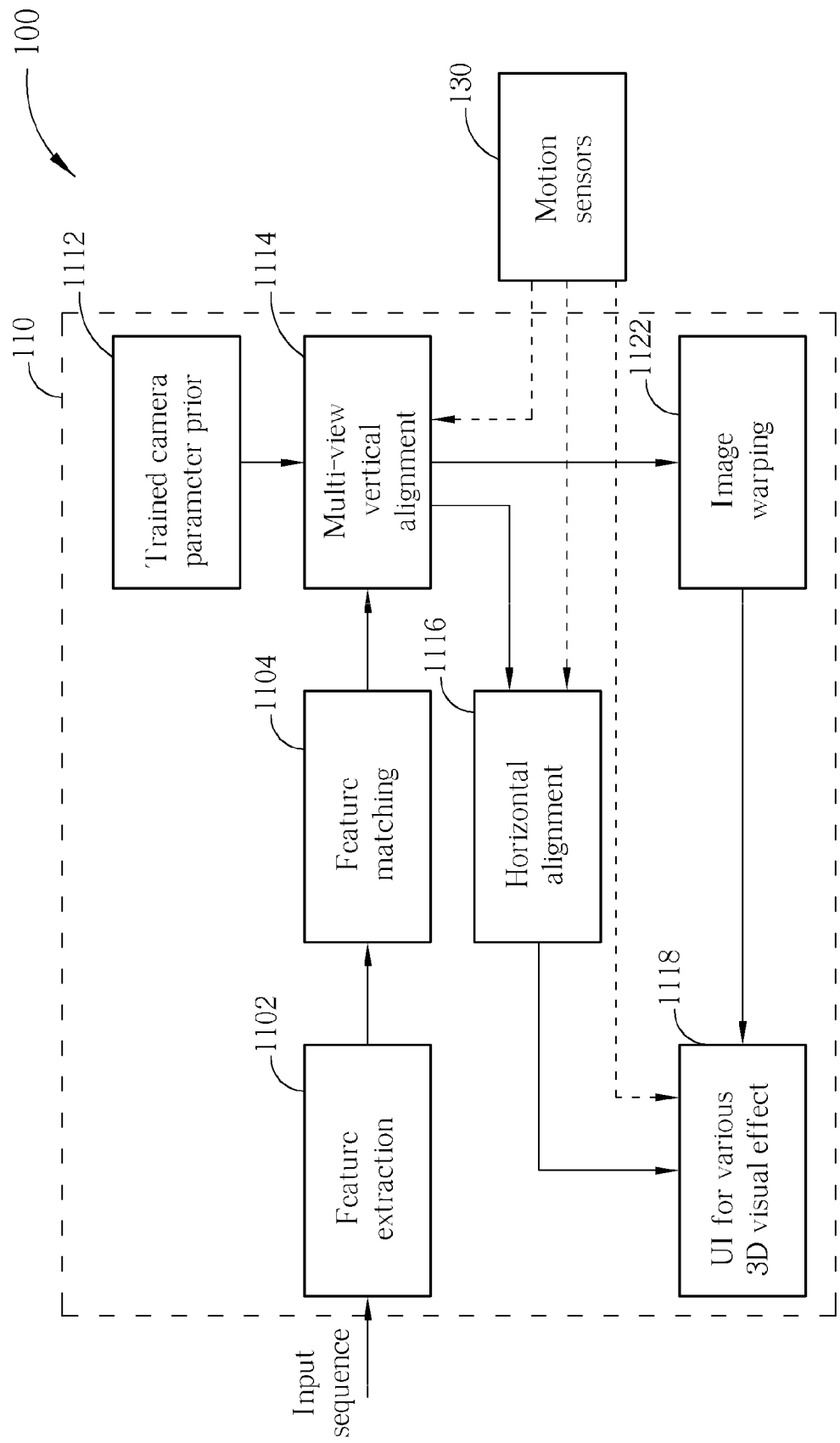
FIG. 11 illustrates the apparatus shown in FIG. 1 according to an embodiment of the present invention, where the processing circuit thereof comprises some processing modules involved with the image processing method shown in FIG. 4, and can selectively operate with aid of motion information generated by some motion sensors when needed.

FIG. 11 illustrates the apparatus 100 shown in FIG. 1 according to an embodiment of the present invention, where the processing circuit 110 thereof comprises some processing modules involved with the image processing method 200 shown in FIG. 4, and can selectively operate with aid of motion information generated by some motion sensors 130 when needed. Examples of the processing modules mentioned above may comprise a feature extraction module 1102 (labeled "Feature extraction"), a feature matching module 1104 (labeled "Feature matching"), a trained camera parameter prior module 1112 (labeled "Trained camera parameter prior"), a multi-view vertical alignment module 1114 (labeled "Multi-view vertical alignment"), a horizontal alignment module 1116 (labeled "Horizontal alignment"), a various 3D visual effect user interface (UI) module 1118 (labeled "UI for various 3D visual effect"), and an image warping module 1122 (labeled "Image warping").

Based upon an input sequence that is input into the processing circuit 110 (more particularly, the image data of the input sequence, such as the image data of the plurality of images mentioned in Step 210), the feature extraction module 1102 and the feature matching module 1104 are arranged to perform the feature extraction and the feature matching disclosed above, respectively, while the trained camera parameter prior module 1112 is arranged to store results of the learning/training results regarding the aforementioned solution such as the predefined solution space, and more particularly, some trained camera parameters that are obtained during the learning/training procedure. In addition, the multi-view vertical alignment module 1114 and the horizontal alignment module 1116 are arranged to perform at least one portion (e.g. a portion or all) of the multi-view vertical alignment disclosed above and at least one portion (e.g. a portion or all) of the horizontal alignment disclosed above, respectively, where the image warping module 1122 is arranged to perform image warping (more particularly, the aforementioned visually insensible image warping) when needed. Additionally, the various 3D visual effect UI module 1118 is arranged to reproduce the 3D visual effect mentioned above, and more particularly, to perform various kinds of 3D visual effects when needed.

According to this embodiment, the motion sensors 130 can be optional since the processing circuit 110 can operate properly and correctly without the aid of the aforementioned motion information generated by the motion sensors 130, and therefore, the information paths from the motion sensors 130 to the processing circuit 110 are illustrated with dashed lines to indicate the fact that the motion sensors 130 can be optional. However, in a situation where the apparatus 100 is equipped with the motion sensors 130, the calculation load of the processing circuit 110 can be decreased since the aforementioned motion information may be helpful. Similar descriptions are not repeated in detail for this embodiment.

Figure 12:
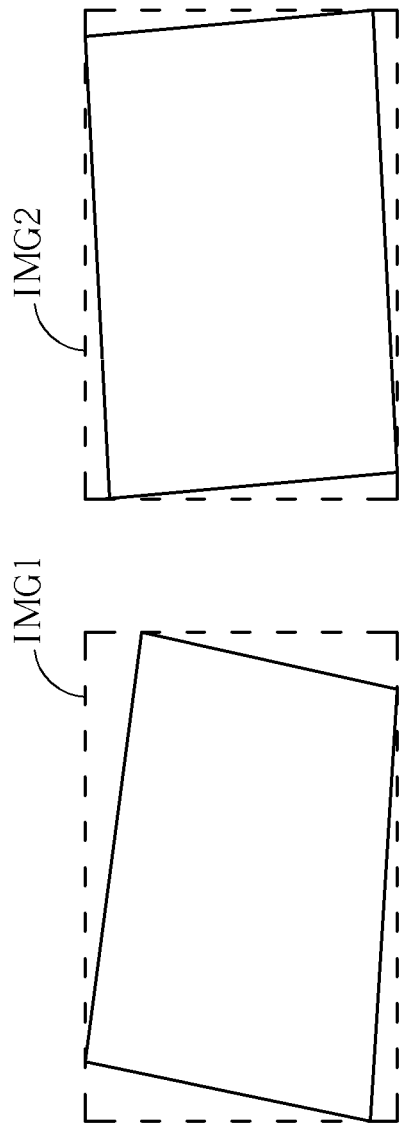
FIG. 12 illustrates two images under processing of global/local coordinate transformation involved with the image processing method shown in FIG. 4 according to an embodiment of the present invention.
Figure 13:
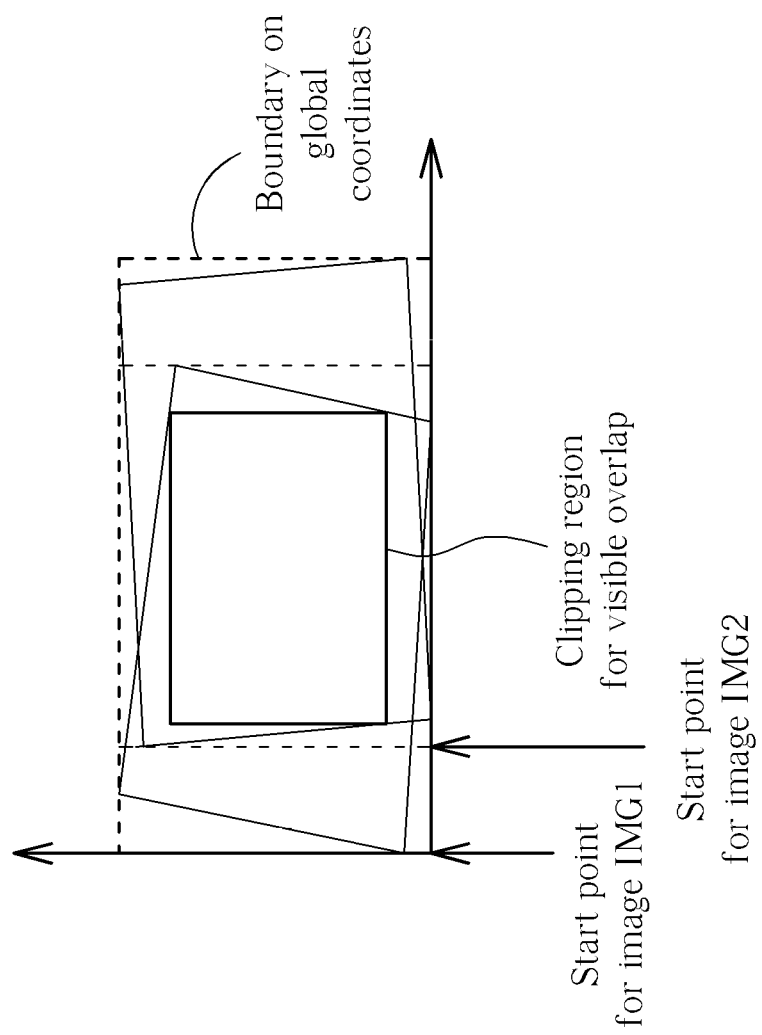
FIG. 13 illustrates the global/local coordinate transformation performed on the two images shown in FIG. 12.

FIG. 12 illustrates two images IMG1 and IMG2 under processing of global/local coordinate transformation involved with the image processing method 200 shown in FIG. 4 according to an embodiment of the present invention, and FIG. 13 illustrates the global/local coordinate transformation performed on the two images IMG1 and IMG2 shown in FIG. 12.

As shown in FIG. 12, the processing circuit 110 can perform image processing on the images IMG1 and IMG2 by performing rotating, shifting, cropping, and/or warping operations on the images IMG1 and IMG2, respectively, where the warped rectangles respectively illustrated in the images IMG1 and IMG2 shown in FIG. 12 (i.e. those depicted with non-dashed lines) may represent the processed results of the images IMG1 and IMG2, respectively. As shown in FIG. 13, the processing circuit 110 may determine a clipping region for each of the processed results of the images IMG1 and IMG2 by virtually "overlapping" the images IMG1 and IMG2 and the processed results thereof on a set of global coordinates, which can be regarded as a common set of global coordinates for processing the images IMG1 and IMG2. For example, on the set of global coordinates, the start point for the image IMG1 can be located at the origin, and the start point for the image IMG2 can be located at a specific point on the horizontal axis, where the clipping region can be a maximum rectangular region available for both of the processed results of the images IMG1 and IMG2.

Figure 14:
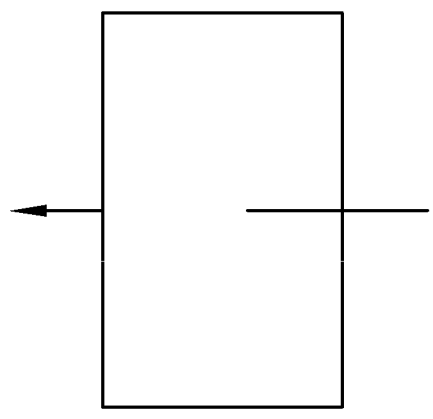
FIG. 14 illustrates two images aligned to background motion (s) for three-dimensional (3D) display involved with the image processing method shown in FIG. 4 according to an embodiment of the present invention.
Figure 14:
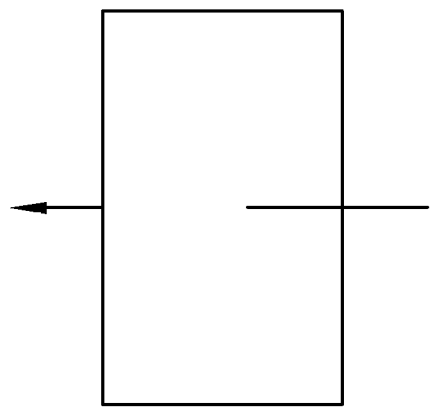
Figure 15:
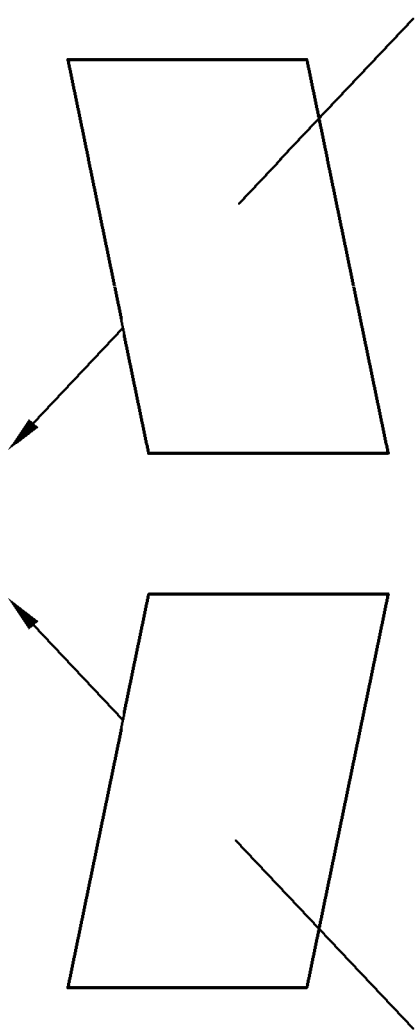
FIG. 15 illustrates two images aligned to foreground motion (s) for a multi-angle view (MAV) visual effect involved with the image processing method shown in FIG. 4 according to another embodiment of the present invention.

In practice, the start point for the image IMG1 and the start point for the image IMG2 can be determined based upon the proposed distance from the eyes of a viewer (e.g. the user) to the point of focus, such as the proposed distance (more particularly, the proposed horizontal distance) between the viewer and the convergence point where the sightlines of the respective eyes of the viewer converge. For example, in a situation where the 3D visual effect is supposed to be 3D display (or stereoscopic display), the processing circuit 110 can align the images IMG1 and IMG2 to background motion(s), where the embodiment shown in FIG. 14 is typical of this situation. As a result, the start point for the image IMG1 and the start point for the image IMG2 may be close to each other. In another example, in a situation where the 3D visual effect is supposed to be the MAV visual effect mentioned above, the processing circuit 110 can align the images IMG1 and IMG2 to foreground motion(s), where the embodiment shown in FIG. 15 is typical of this situation. As a result, the start point for the image IMG1 and the start point for the image IMG2 may be far from each other, in comparison with the embodiment shown in FIG. 14.

Figure 16:
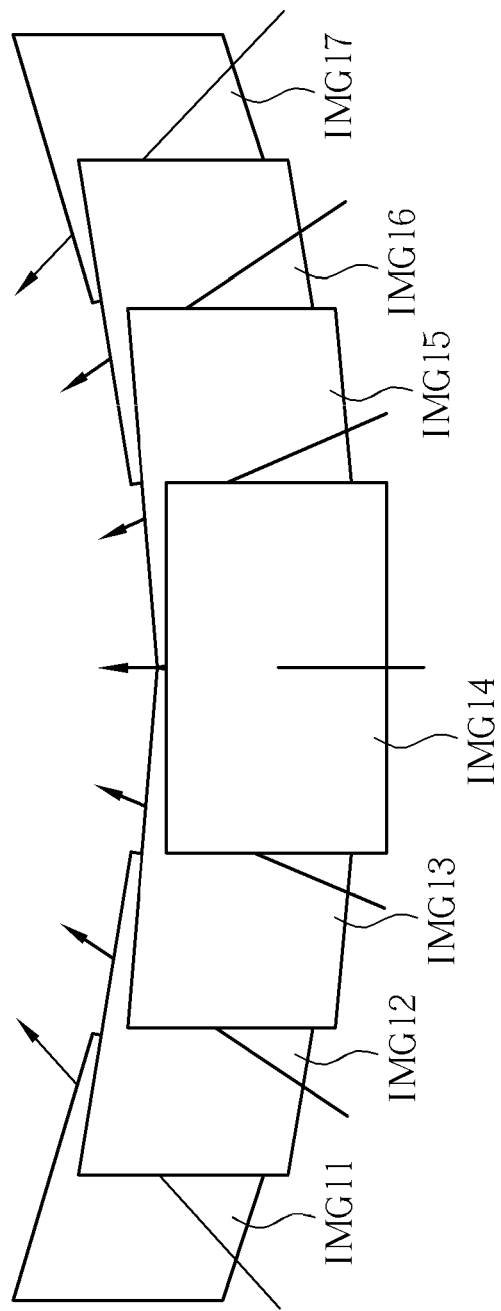
FIG. 16 illustrates a portrait mode of a plurality of display modes involved with the image processing method shown in FIG. 4 according to an embodiment of the present invention.
Figure 17:
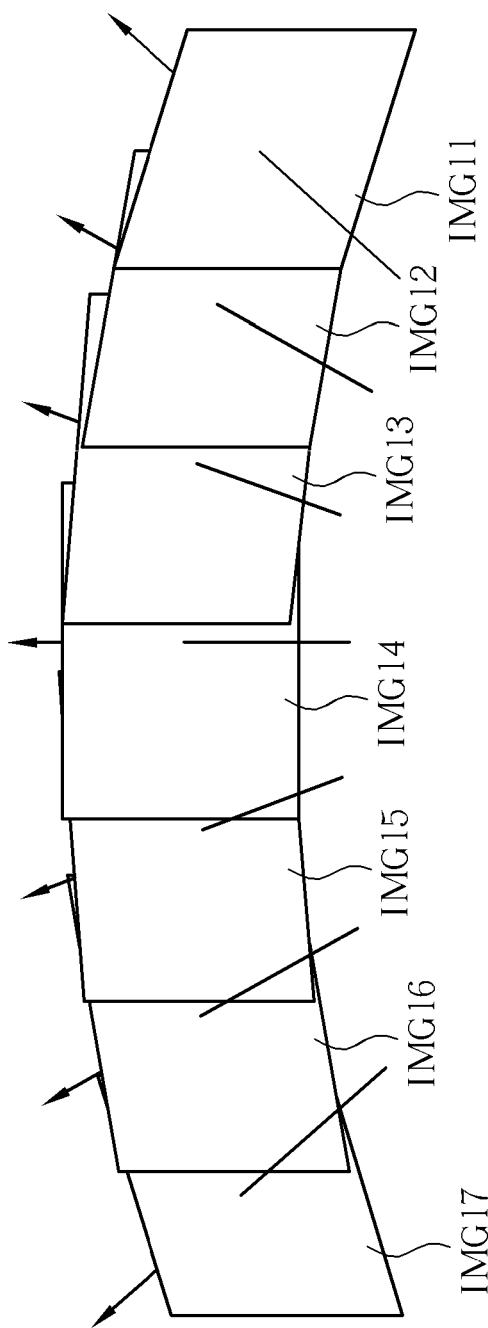
FIG. 17 illustrates a panorama mode of the plurality of display modes according to the embodiment shown in FIG. 16.

FIG. 16 illustrates a portrait mode of a plurality of display modes involved with the image processing method 200 shown in FIG. 4 according to an embodiment of the present invention, and FIG. 17 illustrates a panorama mode of the plurality of display modes according to this embodiment, where the processing circuit 110 is capable of switching between different display modes within the plurality of display modes, and more particularly, is capable of switching between the portrait mode and the panorama mode.

For example, referring to FIG. 16, some warped images bounded to the aforementioned predefined solution space (e.g. the pre-trained solution space) are aligned to foreground, such as the location where an actor/actress is supposed to be in front of the viewer. When it is detected that switching to the panorama mode is required (e.g. the viewer such as the user triggers the switching operation, or a predetermined timer triggers the switching operation), the processing circuit 110 rearrange these warped images in a reversed order and utilizes the rearranged warped images as the warped images for the panorama mode, where the leftmost warped image shown in FIG. 16 (i.e. the warped image IMG11 thereof) is arranged to be the rightmost warped image shown in FIG. 17 (i.e. the warped image IMG11 thereof), and the rightmost warped image shown in FIG. 16 (i.e. the warped image IMG17 thereof) is arranged to be the leftmost warped image shown in FIG. 17 (i.e. the warped image IMG17 thereof). This is for illustrative purposes only, and is not meant to be a limitation of the present invention. According to a variation of this embodiment, in a situation where the processing circuit 110 prepares the warped images for the panorama mode first, when it is detected that switching to the portrait mode is required (e.g. the viewer such as the user triggers the switching operation, or a predetermined timer triggers the switching operation), the processing circuit 110 rearrange the warped images for the panorama mode in a reversed order and utilizes the rearranged warped images as the warped images for the portrait mode. Similar descriptions are not repeated in detail for this variation.

Based upon the embodiments/variations disclosed above, the image processing method 200 comprises performing automatic multiple image alignment in terms of the aforementioned predefined solution space (e.g. the pre-trained solution space) for reproducing the 3D visual effect from an image sequence, in which each image can be captured with an uncalibrated camera module (e.g. the camera module 130) or an uncalibrated hand-held camera. More particularly, the image processing method 200 comprises learning a model consisted of physical camera parameters, which can be utilized for performing visually insensible image warping. Examples of the parameters under consideration may comprise the extrinsic parameters for rotational variations, the intrinsic parameters for camera calibration matrix and lens distortion. The image processing method 200 further comprises, from the corresponding feature points of the input sequence, performing the multi-view vertical alignment constrained by the learned camera parameters. The alignment process turns out a constrained optimization problem for image warping that is visually insensible to human vision. In addition, the image processing method 200 further comprises performing the horizontal alignment through the disparity analysis from the vertically-aligned matching points. Additionally, the image processing method 200 further comprises utilizing the UI such as a graphical UI (GUI) to reproduce the 3D visual effect by using the extracted alignment information and the warped image sequence.

It is an advantage of the present invention that the present invention method and apparatus can generate warped images bounded to the aforementioned solution such as the predefined solution space (e.g. the pre-trained solution space) to make the associated learned geometric distortion be insensible by human vision, so that there is no artifact in respective reproduced image. In addition, the optimization over the solution space according to the learned geometry constraint can always generate rational results. Regarding the implementation of the present invention method and apparatus, the working flow of the associated calculations can be highly paralleled, and the associated computational complexity is low and the required memory resource is economy. In contrast to the related art, the present invention method and apparatus are robust to the image noises and outliers. Additionally, the present invention method and apparatus preserve the relative disparity/depth information in the warped image sequence, which is very important to image-based 3D applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image processing method, comprising:
receiving image data of a plurality of images being captured under different view points;
selecting one of the images as a first image; and
warping the remaining images with reference to the first image according to at least one constrained physical camera parameters,
wherein the at least one constrained physical camera parameters are obtained from a predefined solution space during a learning/training procedure, wherein the learning/training procedure comprises:
(1) capturing a base image;
(2) capturing multiple reference images;
(3) recording one set of physical camera parameters corresponding to each reference image;
(4) warping the base image to match each reference image according to the recorded set of physical camera parameters; and

(5) determining the constrained physical camera parameters by finding whether difference(s) between warped base images and the reference images is undistinguishable under human vision.

2. The image processing method of claim 1, wherein the step of warping the remaining images includes vertical alignment and horizontal alignment.

3. The image processing method of claim 2, wherein the horizontal alignment is performed after the vertical alignment is performed.

4. The image processing method of claim 3, wherein the horizontal alignment is performed under disparity analysis, wherein the disparity analysis is utilized for analyzing warped images of the vertical alignment.

5. The image processing method of claim 1, wherein the step of warping the remaining images further comprises:
automatically warping the remaining images to reproduce a three-dimensional (3D) visual effect.

6. The image processing method of claim 5, further comprising:
generating 3D images to reproduce the 3D visual effect, where the 3D images comprise emulated images that are not generated by utilizing any camera.

7. The image processing method of claim 5, wherein the 3D visual effect comprises a multi-angle view (MAV) visual effect.

8. The image processing method of claim 5, wherein the 3D visual effect comprises a 3D panorama visual effect.

9. The image processing method of claim 5, wherein the plurality of images is captured by utilizing a camera module; and the camera module is not calibrated with regard to the view points.

10. An apparatus for performing image processing, the apparatus comprising at least one portion of an electronic device, the apparatus comprising:
a storage arranged to temporarily store information; and
a processing circuit arranged to control operations of the electronic device, to receive image data of a plurality of images being captured under different view points, to select one of the images as the reference image; and to warp the remaining images with reference to the reference image according to at least one constrained physical camera parameters, wherein the at least one constrained physical camera parameters are obtained from a predefined solution space during a learning/training procedure, wherein the learning/training procedure comprises:
(1) capturing a base image;
(2) capturing multiple reference images;
(3) recording one set of physical camera parameters corresponding to each reference image;
(4) warping the base image to match each reference image according to the recorded set of physical camera parameters; and
(5) determining the constrained physical camera parameters by finding whether difference(s) between warped base images and the reference images is undistinguishable under human vision.

11. The apparatus of claim 10, wherein the step of warping the remaining images includes vertical alignment and horizontal alignment.

12. The apparatus of claim 11, wherein the horizontal alignment is performed after the vertical alignment is performed.

13. The apparatus of claim 12, wherein the horizontal alignment is performed under disparity analysis, wherein the disparity analysis is utilized for analyzing warped images of the vertical alignment.

14. The apparatus of claim 10, wherein the processing circuit automatically warps the remaining images to reproduce a three-dimensional (3D) visual effect.

15. The apparatus of claim 14, wherein the processing circuit generates 3D images to reproduce the 3D visual effect, wherein the 3D images comprise emulated images that are not generated by utilizing any camera.

16. The apparatus of claim 14, wherein the 3D visual effect comprises a multi-angle view (MAV) visual effect.

17. The apparatus of claim 14, wherein the 3D visual effect comprises a 3D panorama visual effect.

18. The apparatus of claim 14, wherein the plurality of images is captured by utilizing a camera module; and the camera module is not calibrated with regard to the view points.

* * * * *